(12) United States Patent
Saints et al.

(10) Patent No.: US 6,430,170 B1
(45) Date of Patent: Aug. 6, 2002

(54) METHOD AND APPARATUS FOR GENERATING RANDOM NUMBERS FROM A COMMUNICATION SIGNAL

(75) Inventors: Keith Saints; John W. Noerenberg, both of San Diego, CA (US)

(73) Assignee: Qualcomm Inc., San Diego, CA (US)

( * ) Notice: Subject to any disclaimer, the term of this patent is extended or adjusted under 35 U.S.C. 154(b) by 0 days.

(21) Appl. No.: 09/321,281

(22) Filed: May 27, 1999

(51) Int. Cl.[7] .................................................. H04J 3/06
(52) U.S. Cl. ...................... 370/335; 370/206; 370/324; 370/479; 370/515; 375/149; 708/250
(58) Field of Search ................................. 370/252, 320, 370/324, 335, 342, 515, 203, 205, 441, 479; 375/136, 137, 147, 148, 149, 146, 340; 455/352, 353; 342/89, 194; 708/250, 254, 256

(56) References Cited

U.S. PATENT DOCUMENTS

| 5,550,811 A | * | 8/1996 | Kaku et al. ..................... 370/18 |
| 5,577,022 A | | 11/1996 | Padovani et al. ............. 370/13 |
| 5,644,591 A | | 7/1997 | Sutton ......................... 375/200 |
| 5,696,828 A | | 12/1997 | Koopman ..................... 380/46 |
| 5,719,579 A | * | 2/1998 | Torre et al. .................. 342/194 |
| 5,778,069 A | | 7/1998 | Thomlinson et al. ......... 380/25 |
| 5,805,648 A | | 9/1998 | Sutton ......................... 375/367 |
| 5,862,452 A | * | 1/1999 | Cudak et al. ................ 455/352 |

FOREIGN PATENT DOCUMENTS

| EP | 0781063 | 11/1996 | ............ H04Q/7/32 |
| WO | 9623376 | 8/1996 | ............ H04L/9/08 |

* cited by examiner

*Primary Examiner*—Douglas Olms
*Assistant Examiner*—Shick Hom
(74) *Attorney, Agent, or Firm*—Philip R. Wadsworth; Gregory D. Ogrod; Thomas M. Thibault

(57) ABSTRACT

A system and method for generating random numbers in a wireless communication network is presented. The noise present in the signal received by a wireless receiver is extracted to form random numbers. Wireless transmitters typically are identified by a synchronization signal. In acquiring the synchronization signal, a wireless receiver generates a plurality of psuedorandom sequences, despreads an incoming signal, integrates the resulting signal, and performs an energy computation to calculate an energy measure. One or more energy measures are collected in a pool of bits, and the bits are hashed to extract random numbers.

32 Claims, 5 Drawing Sheets

METHOD AND APPARATUS FOR GENERATING RANDOM NUMBERS FROM A COMMUNICATION SIGNAL

The U.S. Government has a paid-up license in this invention and the right in limited circumstances to require the patent owner to license others on reasonable terms as provided for by the terms of (MDA904-96-G-0035) awarded by the National Security Agency.

BACKGROUND OF THE INVENTION

I. Field of the Invention

The present invention relates to random number generators. More particularly, the present invention relates to a system and method for generating random numbers in a wireless communication network.

II. Description of the Related Art

As wireless communication systems are gaining in popularity, there is an increase in the demand for security within the systems. Secured networks would allow for the wireless transmission of secret information for military applications. Individuals may benefit from this technology as their privacy may be better protected.

A wireless communication system in which security may be desired makes use of code division multiple access (CDMA) modulation techniques. Although other techniques such as time division multiple access (TDMA), frequency division multiple access (FDMA), and amplitude modulation (AM) schemes such as amplitude companded single sideband (ACSSB) are known, CDMA has significant advantages over these other techniques. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," assigned to the assignee of the present invention and incorporated by reference herein.

In the wireless CDMA system, a large number of wireless subscriber units, each having a transceiver, communicates through satellite repeaters or terrestrial stations. The subscribers may wish to engage in secured communication. Public key cryptography forms the basis for a secure connectivity between two subscribers. In a wireless system, processes that make use of public key cryptography include over-the-air authentication of a subscriber unit, establishment of a secure session for a web browser, and encryption of transmitted data.

Public key cryptography uses a "public key" to encrypt a message and a "private key" to decrypt the message. The public key may be made public: Anyone may use the public key to encrypt the message, but only the individual with the corresponding private key can decrypt the message. One variation of public key cryptography further makes use of a "session key." In this variation, user A sends user B a public key. User B generates a random session key, encrypts it using user A's public key, and sends it to user A. User A decrypts user B's message using a private key to recover the session key. Then, both users encrypt their communications using the same session key.

Public key cryptography relies on a random number generator. Random numbers are used for creating public/private key pairs and producing session keys. Pseudo-random number generators are readily available, but they may not provide the level of security desired. Pseudo-random generators make use of a seed to generate a known sequence of numbers. If the seed and the generator are discovered, an adversary may break the cryptosystem.

A few real random-sequence generators are now available. Two examples are the ring oscillator and the noise diode. Both are hardware devices that make use of noise in the electrical circuits to generate random numbers. The ring oscillator samples the ringing in a LCR circuit. The noise diode digitizes the noise present in voltage of a silicon diode. These devices perform well, but are costly and therefore not always a practical choice. For use in a wireless subscriber unit, the random number generator should have little impact on the manufacturing cost of the unit. Additionally, the random number generator should not drain the battery of the unit. A random number generator that possesses these characteristics is provided by the present invention in the manner described below.

SUMMARY OF THE INVENTION

The present invention makes use of features existing in a wireless communication network for generating random numbers. The noise present at the input to a wireless receiver is exploited as a source of real random numbers. A wireless communication network, such as the code division multiple access (CDMA) system, generally utilizes a pilot signal to identify a transmitter. The pilot signal is typically a pseudorandom noise (PN) sequence, in some cases having a predetermined time offset. At a wireless receiver, the pilot needs to be demodulated to obtain a reference for time, phase, and signal strength. To demodulate the pilot signal, the receiver must determine the particular pilot PN sequence, generally by using multiple hypotheses tested against an incoming signal to determine the particular pilot signal. For each hypothesis tested, the receiver generates a PN sequence, uses this PN sequence to despread the incoming signal, integrates the resulting signal coherently, and performs an energy measure. If the energy measure is high enough, the receiver may conclude that the synchronization signal has been acquired. The present invention recognizes that there is a random component in the energy measures determined by the receiver. The randomness is extracted for generating random numbers.

In accordance with the present invention, an energy measure is obtained for a signal despread with a hypothesized PN sequence. The energy measure may be tested to ensure that it meets certain minimum criteria. The energy measure is then added to a pool of bits. The energy sample is mixed with the current state of the pool, using a hash function, to produce a new pool state. In a preferred embodiment, the hash function is a SHA-1 function. Then, a second hash function may be performed to mix the bits in the pool before a random number is extracted. In the preferred embodiment, the second hash function is also the SHA-1 function. The extracted random number may also be tested for compliance with certain minimum criteria before the number is provided for use.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

The present invention provides a system and method for generating random numbers for use in wireless communication applications. The random numbers are useful in processes such as the generation of cryptographic keys. The present invention recognizes that randomness exists in the noise present at the input to a wireless receiver. The entropy extracted from the noise may be used as a source of random number generation.

Figure 1:
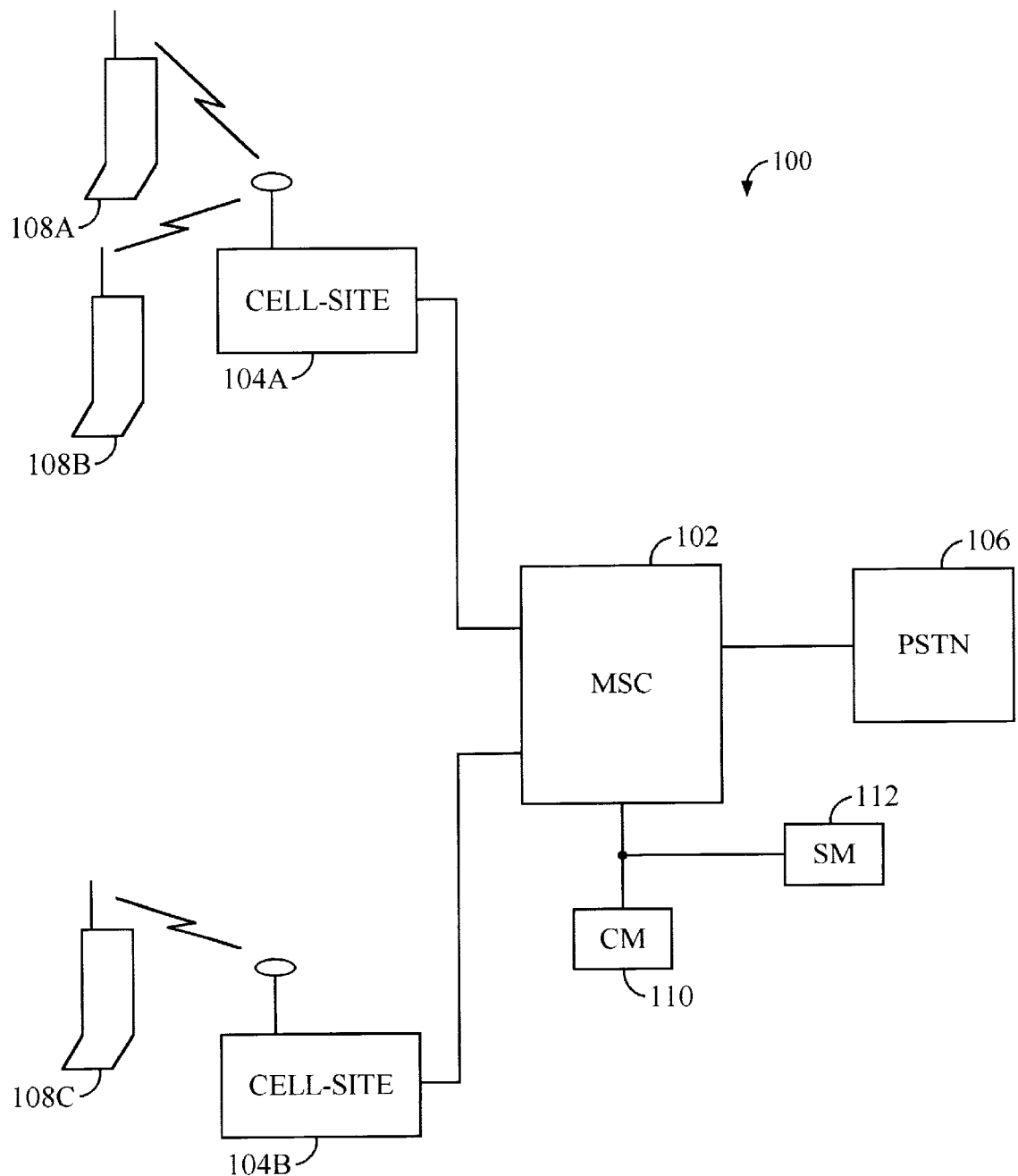
FIG. 1 is a block diagram of a wireless communication system in which the present invention may be embodied.

An exemplary wireless communication system in which the present invention is embodied is illustrated in FIG. 1. In a preferred embodiment, the communication system is a CDMA wireless communication system, although it should be understood that the present invention may also be applicable to other types of communication systems.

The wireless system is indicated generally by 100 and includes a mobile switching center (MSC) 102 that includes interface and processing circuitry for providing system control to the cell-sites 104a and 104b. The MSC 102 routes telephone calls from the public switched telephone network (PSTN) 106 to the appropriate cell-site for transmission to the appropriate subscriber unit. The MSC 102 also controls the routing of calls from the subscriber units via one or more cell-sites to the PSTN 106. In addition, the MSC 102 may direct calls between subscriber units via the appropriate cell-sites. The MSC 102 may be coupled to the cell-sites by various conventional means, such as dedicated telephone lines, optical fiber links, or by radio frequency communications.

In FIG. 1, two exemplary cell-sites 104a and 104b, along with three exemplary subscriber units (SUs) 108a–108c, are illustrated. The cell-sites 104a and 104b are generally satellite repeaters or terrestrial stations through which wireless subscriber units communicate. Each cell-site routes calls carried over the subscriber units to and from a telecommunication network via a mobile switching center. Referring to FIG. 1, the subscriber units 108a and 108b are within the geographic area covered by the cell-site 104a, while the subscriber unit 108c is within the geographic area covered by the cell-site 104b. When a subscriber moves into the geographic area of a new cell-site, the routing of that subscriber's call may subsequently be made through the new cell-site. The subscriber units 108a–108c may be mobile stations (MSs) such as mobile telephones or Personal Communication System (PCS) stations, or some other wireless subscriber equipment such as the Fixed Wireless Terminal (FWT).

In a point-to-point system, one subscriber unit communicates with one other subscriber unit. For example, the subscriber unit 108a may be involved in a telephone call with the subscriber unit 108c. An exemplary point-to-point system is described in U.S. Pat. No. 4,901,307 mentioned above. Each subscriber unit 108a, 108b, or 108c may additionally be configured for point-to-multipoint communication. In a point-to-multipoint, or broadcast system, one subscriber, such as subscriber unit 108a, may communicate with one or more subscribers, such as subscriber units 108b and 108c. Typically, broadcast groups or "nets" are set up, and a subscriber selects from a list of the nets to communicate with. A "talker" may then broadcast messages to many "listeners." A communications manager (CM) 110, coupled to the MSC 102, will generally be included in the system to manage the real-time and administrative operation of the nets, including call requests, maintenance and distribution of net membership, call set-up and tear-down of necessary CDMA system and network resources, as well as overall control of net status.

In both point-to-point and point-to-multipoint systems, cryptography may be implemented to protect transmitted messages. Generally, encryption and decryption are performed within the SUs 108a–108c. However, an optional security manager (SM) 112 may be provided in the wireless system 100. The SM 112 performs key management, user authentication, and related tasks to support security. The SM 112 is generally responsible for the management of net security attributes, including the distribution of net keys. The SM 112 may be located within a wireless service provider's infrastructure, such as MSC 102, or may reside outside the wireless network, as is shown in FIG. 1.

Public key cryptography is one technique for establishing secured communication between subscribers. Using public key cryptography, keys are used to encrypt and decrypt messages. The protocol is based on the creation of keys from random numbers. Thus, a good random number generator is needed.

The present invention recognizes that random bits may be extracted from the noise intrinsic to the CDMA signal environment. Specifically, entropy extracted from the noise present at the input to the CDMA detector is used to build a pool of random bits from which random numbers are generated. The random numbers may then be used in processes such as cryptography.

In the wireless system 100 of FIG. 1, a CDMA spread spectrum communication technique may be utilized wherein all wireless transmitters, including the cell-sites 104a and 104b, and the subscriber units 108a–108c share the same channel bandwidth, with each transmitter using a unique code to distinguish its signal. The codes are chosen so that the signals from other users appear as additive interference. Multi-path, reflections from the changing landscape surrounding the user, is an additional source of interference. Also, there are thermal noise contributions from the electronic components within the subscriber unit itself. All these effects contribute a significant, unpredictable, random component to the signal processed by the CDMA signal processor.

A pseudorandom noise (PN) sequence may be used to identify the cell-sites 104a and 104b in the wireless system 100. One feature of PN sequences is that time-shifted versions of the same PN sequence have very little correlation with each other. Each cell site 104a or 104b broadcasts a reference signal, called a pilot, by modulating a known sequence of pulses, called chips, with a unique cell-specific PN sequence. In an exemplary embodiment of this invention, the cell-specific PN sequences can be chosen to be time-shifted versions of a basic PN sequence. In this case, each cell is identified by the time-shift of its cell-specific PN sequence relative to the basic PN sequence. This time shift is measured in chips and referred to as the "PN offset" of the cell. During its operation, a CDMA subscriber unit, such as the subscriber unit 108a, 108b, or 108c, demodulates the pilot to obtain a reference for time, phase, and signal strength. A subscriber unit is constantly acquiring and reacquiring pilot signals as the subscriber moves from the coverage area of one cell-site to another. The noise intrinsic to the signal environment provides a constant stream of random data that can be used to create random numbers.

At the cell-site 104a or 104b, the pilot signal is generated by modulating a baseband signal by an in-phase (I) PN code and a quadrature (Q) PN code. The I and Q signals are also referred to in the art as the 0 degree and 90 degree components, respectively. The pilot signal is then transmitted by the cell-site 104a or 104b.

At the subscriber unit 108a, 108b, or 108c, a special purpose microprocessor, typically referred to as the Mobile Station Modem (or MSM) is responsible for modulation and demodulation of CDMA signals in order to maintain a communications link with the cellular network. A subsystem of the MSM referred to in the art as the searcher is responsible for acquiring pilot signals and synchronizing the subscriber unit with the broadcast from the cell. An exemplary searcher and method for searching for pilot signals can be found in U.S. Pat. Nos. 5,644,591 and 5,805,648, both entitled "Method And Apparatus For Performing Search Acquisition In A CDMA Communication System" and U.S. Pat. No. 5,577,022 entitled "Pilot Signal Searching Technique for a Cellular Communications System, all three patents issued to the assignee of the present invention.

The searcher measures the energy of the CDMA signal in accordance with various hypothesized cell-specific PN sequences and various timing hypotheses. In accordance with this invention, this energy data generated by the searcher unit is used as the source for random bits.

A subscriber unit, such as the subscriber unit 108a, 108b, or 108c, must determine the cell-specific PN sequence and timing in order to successfully demodulate the incoming CDMA signal. When each cell is identified by its PN offset relative to a basic PN sequence, the timing hypothesis can be combined with the hypothesized cell PN offset into a single PN offset hypothesis over which the search is conducted. However, it should be obvious to those skilled in the art that the technique described in this invention can be used whether or not the cell-specific PN sequences are chosen to be offsets of a basic PN sequence.

The searcher performs a search during initial acquisition of a CDMA signal in order to initiate a communications link with the cellular network. Because the wireless channel is dynamically changing, the searcher operates continuously even after initial acquisition, scanning for additional multipath signal components of the incoming signal as well as pilot signals from neighboring cells.

In general, the searcher does not exhaustively search all timing hypotheses in a single search. Instead, each search covers a small window of PN offsets. Parameters specifying the size and position of the search window, as well as other parameters that affect the search, are specified by software running in the microprocessor of the subscriber unit 108a, 108b, or 108c. In a preferred embodiment, the searcher itself resides in hardware and performs each search according to the desired specifications and reports the results of the search. In the process of a single search, the searcher generally tries each PN offset in the specified window, with a spacing of ½ PN chip between individual offsets. For each hypothesized PN offset, the searcher generates the PN sequence with that offset, uses this PN sequence to despread the incoming signal, integrates the resulting signal coherently, and performs an energy computation.

Figure 2:
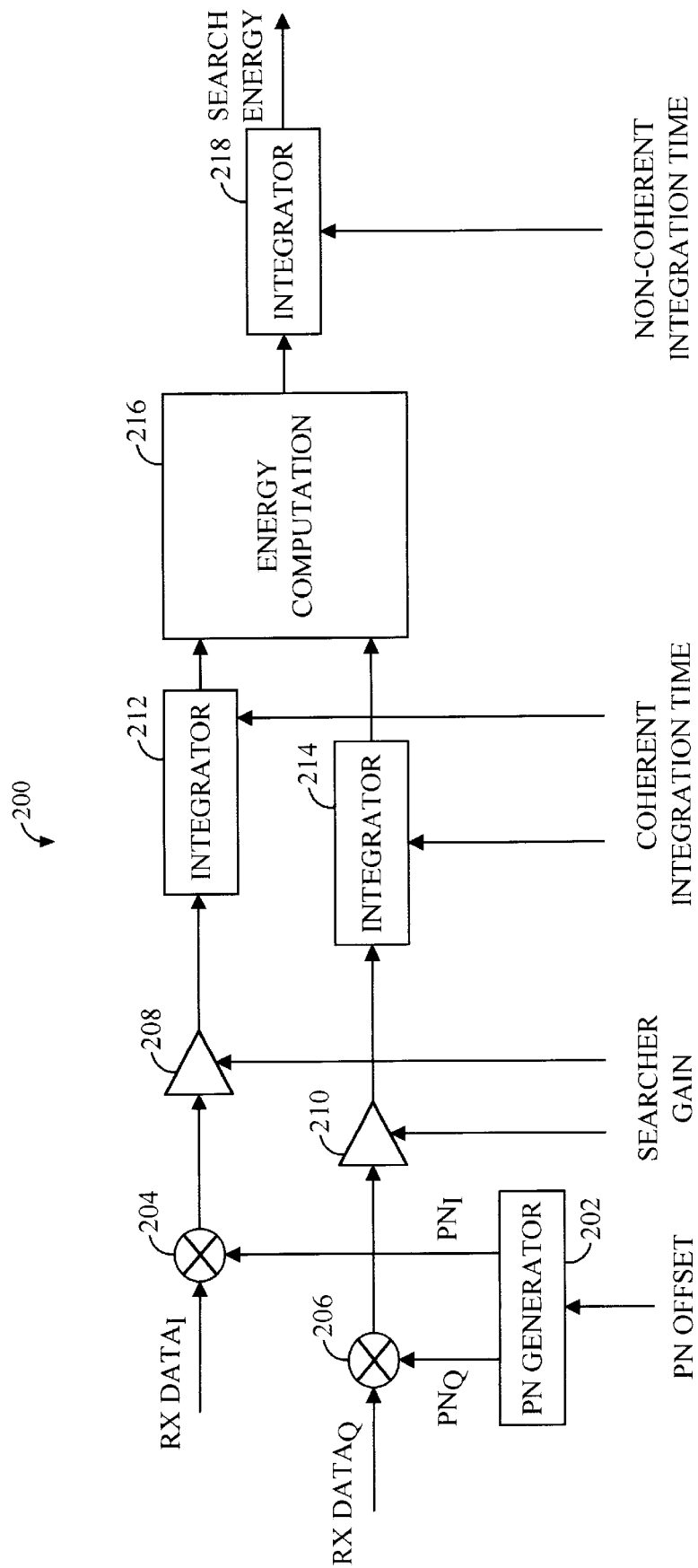
FIG. 2 is a block diagram of a searcher in a wireless subscriber unit.

A block diagram of the processing elements of the searcher 200 is shown in FIG. 2. The searcher 200 receives the I and Q components of a downconverted incoming signal, labeled RX Data$_I$ and RX Data$_Q$. The RX Data$_I$ and RX Data$_Q$ signals are provided by a receiver (not shown) as part of subscriber unit 108a, 108b, or 108c. The searcher 200 comprises multipliers 204 and 206, which receive the signals RX Data$_I$ and RX Data$_Q$, respectively, as a first input. The searcher 200 also comprises a PN generator 202 that generates a PN sequence based on an input of a hypothesized PN offset. The I and Q components of the PN sequence are provided to multipliers 204 and 206, respectively, as a second input. The multiplier 204 despreads the signal RX Data$_I$ by multiplying it with the I component of the PN sequence, while the multiplier 206 despreads the signal RX Data$_Q$ by multiplying it with the Q component of the PN sequence.

Optionally, the searcher 200 may comprise searcher gain elements 208 and 210. Searcher gain elements 208 and 210 may apply gain factors to the despread signals for the purpose of adjusting for power level of the received signal. The despread I and Q signals are then provided to integrators 212 and 214, respectively. The integrators 212 and 214 sum the values of the samples of the despread I and Q signals, respectively. The integrated values for the I and Q components, $I_k$ and $Q_k$, are provided to an energy computation element 216. The energy computation element 216 computes an energy sample by squaring the result of the integrators 212 and 214. Thus, the energy computation element 216 determines an energy sample according to the equation $E_k = I_k^2 + Q_k^2$. The energy sample is provided to a non-coherent integrator 218 which sums the result of one or more coherent integrations. When the specified non-coherent integration interval has elapsed, the integrated energy value is provided to a random number generator, as explained below. In an alternative embodiment, the energy samples are provided directly to the random number generator, bypassing non-coherent integrator 218. It should be understood that a non-coherent integration of one coherent integration results in the same coherent integration.

Figure 3:
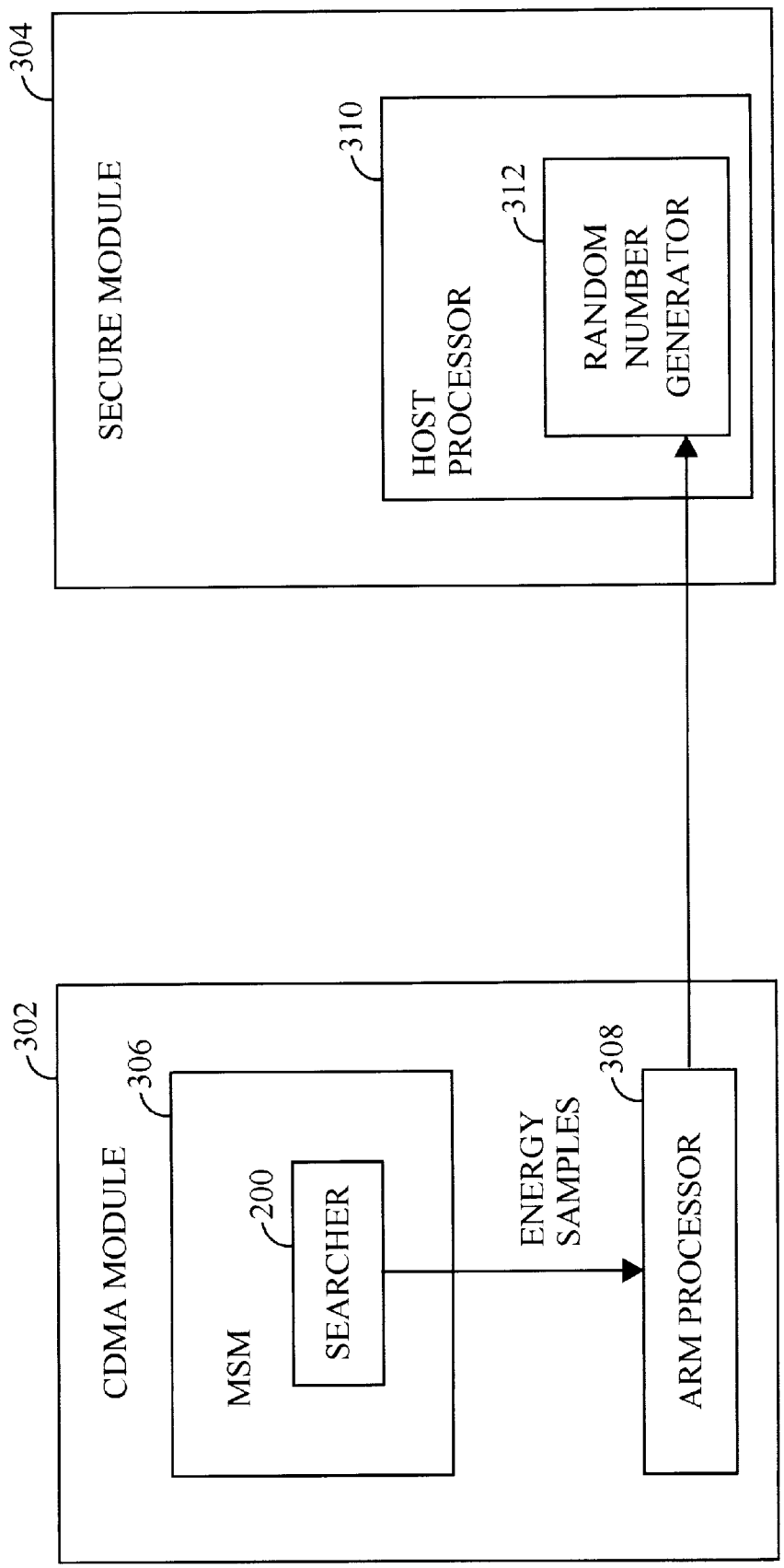
FIG. 3 is a block diagram of the modules involved in random number generation in a wireless subscriber unit.

A block diagram illustrating an exemplary configuration of a CDMA subscriber unit 108 that incorporates the present invention is provided in FIG. 3. The CDMA subscriber unit 108 may, for example, be the subscriber unit 108a, 108b, or 108c of FIG. 1. The CDMA subscriber unit 108 comprises a CDMA module 302 where energy sampling is performed. However, in a preferred embodiment, the processing of the energy samples will be performed in a host processor 310 in a secure module 304. In one implementation, the CDMA module 302 comprises a MSM 306, which in turn comprises the searcher 200 as previously described. The energy samples from the searcher 200 are provided to a microprocessor, such as an ARM processor 308, in the CDMA module 306. The energy samples typically consists of 16-bit energy values reported for each ½-chip offset in the given search window. The host processor 310 and the ARM processor 308 communicate via a packet protocol operated over a shared memory interface. The host processor 310 will request searcher energy data packets via this protocol during normal operation of the CDMA subscriber unit 108a. The energy samples in the data packets will then be the input for a random number generator 312 in the secure module 304.

Note that some care should be taken to avoid correlation between individual samples in the searcher energy values. As previously mentioned, energy values are obtained for each ½-chip offset in a preferred embodiment. Since the CDMA signal is highly correlated within one chip time, every other sample of the energy values should be discarded, leaving samples corresponding to 1 chip spacing to avoid correlation.

The 16-bit energy samples clearly contain a random component owing to interference over the wireless channel as well as thermal noise in the receiver. In one embodiment of the invention, the 16-bit energy samples may be used directly as a source of random data. In this embodiment of the invention, random number generator unit 312 merely passes its input data through to its output.

Although the 16-bit energy samples are somewhat random, they do not generally have a uniform probability distribution; certain bit sequences are more likely to occur than others. In most cryptographic applications, the presence of patterns in the random data will compromise the level of security provided, and thus further processing by random number generator unit 312 is required to produce a random data stream with low autocorrelation.

One simple method of processing the searcher energy data is to simply discard the most significant bits of each energy sample and to use only the least significant bits (LSBs). If the number of noncoherent integrations performed by non-coherent integrator 218 is large, these LSBs can have a probability distribution that is acceptably close to uniform and can be used directly as a source of random data. If the number of noncoherent integrations is small, the LSBs will have a non-uniform, but known distribution. Because the LSBs follow a known distribution, a mapping can be found, either by ad hoc methods, or by following well known techniques from information theory to construct a mapping from the LSBs of the energy samples to a set of bit patterns that have equal likelihood.

A preferred embodiment of the present invention uses a known distillation function to extract the random component from the searcher energy data, rather than using the LSB approach, described above. However, the distillation function could be used in conjunction with the LSB approach in another embodiment.

An example of a distillation function which could be used is a cryptographic hash function. A hash function operates on an arbitrary-length input and returns an output of fixed length. The hash function is one-way if the input cannot be easily computed from the output. Additionally, a one-way hash function has the property that two different inputs are unlikely to produce the same output. A preferred embodiment utilizes the Secure Hash Algorithm-1 (SHA-1), which hashes an arbitrary-length message into a 20-byte value. SHA-1 is described in B. Schneier, *Applied Cryptography*, Second Edition, Wiley 1996, pages 442—445. Other hash functions, such as the MD2 or MD5, may also be used. Alternatively, a data compression scheme such as Lempel-Ziv could be applied to the data as a distillation function.

To obtain a measure of how much random data may be extracted from the energy values, the entropy of the energy data may be computed. Entropy is a measure of the amount of information contained in a message based upon the probability distribution of the possible values of the message. The entropy, measured in bits, is given by the formula:

$$H = -\sum_{E} p_E \log_2 p_E$$

where E ranges over the possible values of a the searcher energy value, and $p_E$ is the probability that the energy value takes the value E. The entropy can then be used to determine the amount of data compression necessary to obtain uniformly distributed samples by processing the searcher energy samples. For example if the entropy of the searcher energy samples is 9 bits of entropy per 16-bit sample then the data must be compressed by at least a 16:9 ratio in order to obtain uniformity.

The entropy of a 16-bit searcher value based on the signal level and the noise level is shown in Table 1. The data was generated for a searcher integration time of 60 chips, a searcher gain of 16 as the maximum value, and different signal levels. The signal level ranges from a very weak signal (−•dB) to a very strong signal (−3 dB). The noise level was varied from low noise (−20 dB) where thermal effects dominate, to a very noisy signal environment where there is interference from a variety of sources. The noise level is unlikely to be less than −19 dB, and even this value is difficult to achieve in practice.

TABLE I

| Noise Level | Signal Level (dB) | | | | | | | |
|---|---|---|---|---|---|---|---|---|
| (dB) | −• | −30 | −20 | −15 | −12 | −9 | −6 | −3 |
| −20 | 5.66 | 7.30 | 7.57 | 7.59 | 7.59 | 7.59 | 4.80 | 0.52 |
| −17 | 6.51 | 7.94 | 8.48 | 8.55 | 8.56 | 8.57 | 5.14 | 0.52 |
| −14 | 7.37 | 8.44 | 9.34 | 9.48 | 9.51 | 9.54 | 5.52 | 0.51 |
| −11 | 8.25 | 8.95 | 10.12 | 10.36 | 10.44 | 10.49 | 5.89 | 0.51 |
| −8 | 9.14 | 9.55 | 10.78 | 11.18 | 11.31 | 11.40 | 6.24 | 0.51 |
| −5 | 10.04 | 10.26 | 11.30 | 11.91 | 12.12 | 12.24 | 6.56 | 0.51 |
| −2 | 10.94 | 11.06 | 11.79 | 12.51 | 12.84 | 12.78 | 6.82 | 0.54 |

Note that the "signal level" refers to the mean value of the searcher integration in the absence of noise. For a PN offset corresponding to a pilot, the signal level is the same as the pilot signal level. For other PN offsets, the signal level should be small but nonzero corresponding to the correlation between the mismatched hypothetical PN sequence and the transmitted PN sequence. The searcher parameters used to generate the values shown in Table I were chosen to maximize gain, but note that when the signal level is high, the entropy decreases rapidly. This is because there is a fairly high probability that the searcher energy will have a saturated value. For example, using a 16-bit searcher value, the searcher energy will have a saturated value of $2^{16}-1=65535$.

The analysis above shows that at least 4 bits of entropy may be reliably counted on per 16-bit sample using the defined parameters. Thus, using SHA-1, the energy data may be hashed in blocks of at least 80 bytes to produce 20-byte values as the input for the random pool.

Figure 4:
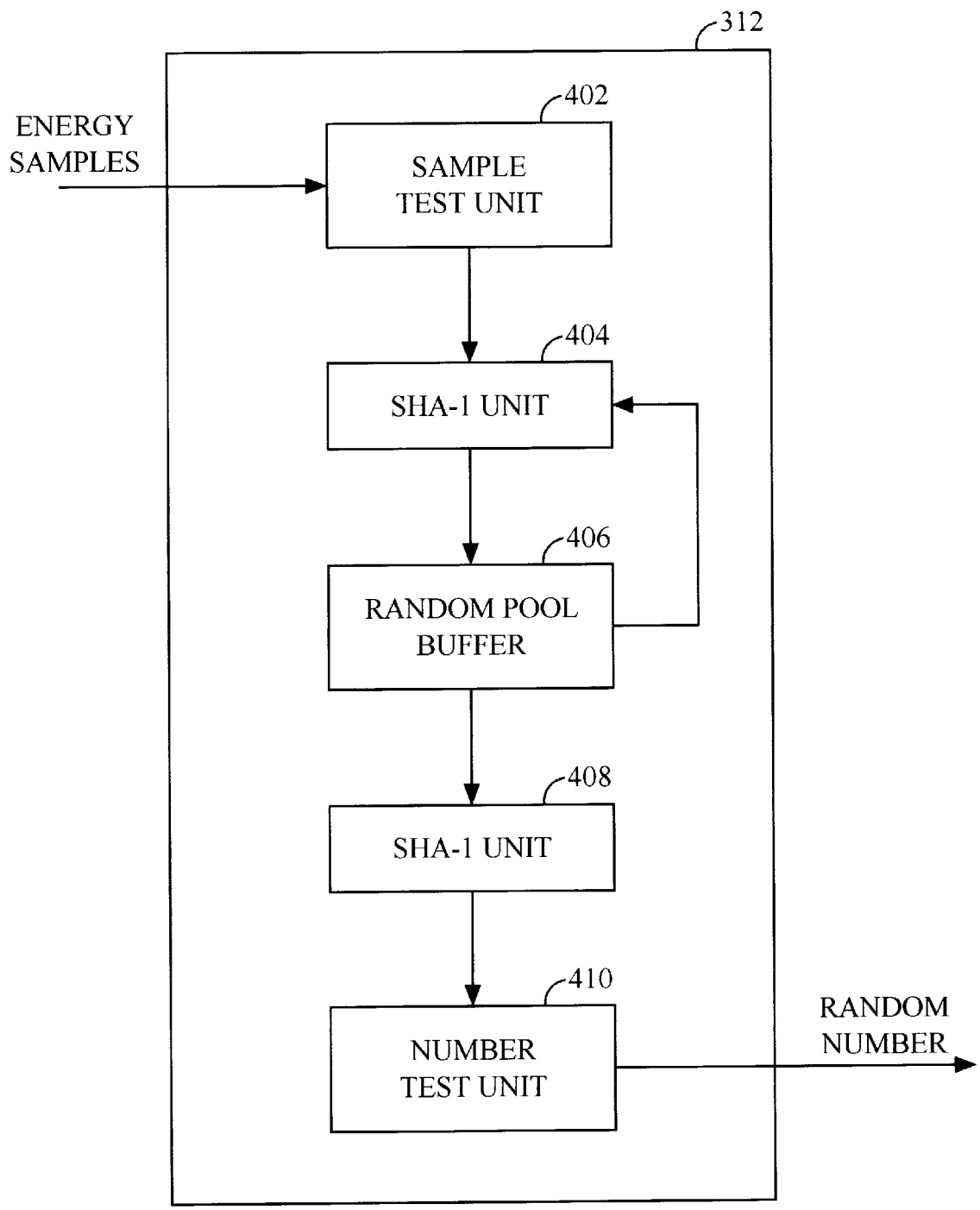
FIG. 4 is a block diagram of the processing blocks of the random number generator of the present invention.

A block diagram showing the processing units of an exemplary embodiment of the random number generator 312 is provided in FIG. 4. It should be noted that FIG. 4 will be explained based on the assumption that 4 bits of entropy are present per 16-bit sample. However, a person skilled in the art will recognize that the assumption will vary based on the parameters of the energy search.

The random number generator 312 comprises a random pool buffer 406. The random pool buffer 406 maintains a pool of random bits while the subscriber unit is in operation. The pool is initialized at power-up by mixing searcher energy samples with the contents of the pool. Since no entropy contribution is desired from the initial state of the pool, the pool will generally be initialized to zero. In a preferred embodiment, the pool will be a buffer large enough to store three random numbers. Three is chosen to provide for the possibility that the random number chosen may not meet the acceptance criteria for the numbers to be used in the specific operation. The mixing functions will make it highly unlikely that multiple attempts to draw a number will fail. However, providing a large enough pool to hold three numbers permits secure operation of the subscriber unit, even if signal conditions temporarily prohibit gathering sample data.

Still referring to FIG. 4, energy samples from the searcher are provided to a sample test unit 402, which tests the samples before mixing the samples into the pool. Sample testing ensures that the energy samples meet some minimum acceptance criteria. Generally, the testing would rejects numbers that are easily guessed, such as all 1's, all 0's, or alternating 1's and 0's.

Energy samples will be gathered at power-up to fill the pool, and between each call to refresh the pool. When a CDMA subscriber unit is powered up, the searcher must acquire the pilot signal. After a call terminates, the searcher must reacquire the pilot. During reacquisition, the searcher will obtain samples where the signal level is varying above the noise floor.

The tested energy samples are provided to a first hash unit 404 for distillation. The hash unit 404 mixes the input data with the current state of the pool. The output of the mixing operation produces a new pool state. In one embodiment, the hash unit 404 performs SHA-1, and each mixing operation takes 80 bytes of sample data from sample test unit 402 and 48 bytes from the pool in buffer 406 to produce 20 new bytes for the pool buffer 406. The 128-byte input buffer is a convenient block size for input to SHA-1. The number of bytes in the energy sample may vary depending on local service provider window sizes, but windows should be large enough to produce at least one block for input to the pool, typically more. When there are fewer than 80 bytes remaining in the current searcher sample, these remaining bytes will be discarded.

A counter may be used to advance through the pool buffer 406 at say, 20 bytes at a time, to mark where the next block of pool bytes are drawn for the mixing operation. Generally, until this counter reaches the end of the pool, the pool will not be considered ready for use. For purposes of mixing, the pool will be considered a ring buffer. When a random number is drawn from the pool, the used bytes are discarded, and the counter is updated so that mixing is done only with bytes not used to produce the random number. Bits mixed in this manner are uniformly distributed according to the entropy in the initial data.

Random bits from the pool buffer 406 are provided to a second hash unit 408. For example, the hash unit 408 may receive pool bytes from the pool buffer 406 in blocks of 64, and mix the pool bytes with SHA-1 to produce a new sequence of 20 bytes. The output of the hash unit 408 may be concatenated to form a number of the required size. Because the pool is uniformly distributed, additional distillation of the data is generally not required. However, using a second hash function to mix the bytes used to form the number provides a layer of isolation between the distillation of the entropy in the data from its use in a random number. While it has no effect on the entropy of the bits used to form the number, the second hashing operation increases the difficulty of cryptanalyzing the random number generator by observing the signal environment and the messages exchanged with a particular subscriber unit.

In a preferred embodiment, as soon as the pool is filled, a random number will be extracted from the pool. The number extracted is then provided to a number test unit 410, which performs additional sanity checks to ensure that the number meets the requirements for use in the required process. The checks are similar to the testing performed on the energy samples by sample test unit 402. For example, numbers that are easily guessed, such as all 1's, all 0's, or alternating 1's and 0's, would be rejected. The number tested by number test unit 410 may then be provided for use as required by a cryptographic or other process.

It should be noted that once initialization of the pool is complete, and a number is extracted, a request for a number may be quickly filled. Once a number is extracted, the process to form a new number can begin. This enables the formation of the number to proceed at a lower priority than other processes in the subscriber unit, yet still assures good response when a number is required.

In another embodiment of the present invention, either the RX Data$_I$, RX Data$_Q$, or both, are used to provide random data to random generator 312 for the purpose of generating random numbers, rather than the searcher energy data provided by energy computational element 216 or non coherent integrator 218. The RX Data$_I$ and RX Data$_Q$ each possess random characteristics that can be utilized by random number generator 312. The RX Data signal(s) can be provided directly to random number generator 312 and processed in the same manner as the searcher energy data. For example, the RX Data signal(s) could be used without processing to generate random numbers. Alternatively, a hashing function could be used to extract the random component from the RX Data signal(s).

Figure 5:
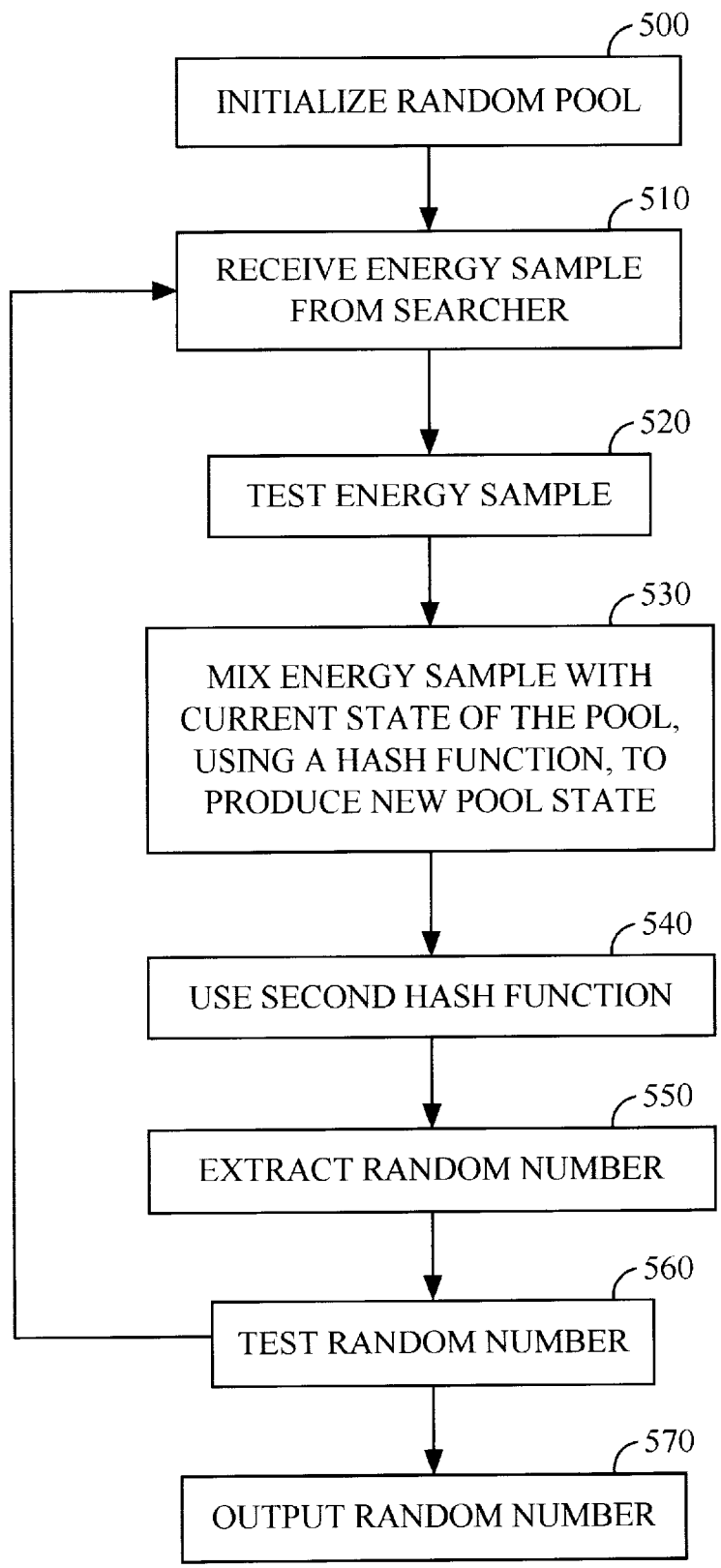
FIG. 5 is a flow chart illustrating the steps involved in random number generation in accordance with the present invention.

Referring now to FIG. 5, a flow chart is shown summarizing some of the steps involved in the random number generation as discussed with reference to FIG. 4. The method of FIG. 5 utilizes the randomness inherent in the noise encountered by a wireless receiver to generate random numbers.

In step 500, a random pool buffer 406 is initialized at power-up by mixing searcher energy samples with the contents of the pool. Since no entropy contribution is desired from the initial state of the pool, the pool will generally be initialized to zero.

In step 510, energy samples from the searcher are received, and provided to sample test unit 402 in step 520, which tests the samples before mixing the samples into the pool. Sample testing ensures that the energy samples meet some minimum acceptance criteria. Generally, the testing would rejects numbers that are easily guessed, such as all 1's, all 0's, or alternating 1's and 0's.

In step 530, the tested energy samples are provided to a first hash unit 404 for distillation. The hash unit 404 mixes the input data with the current state of the pool. The output of the mixing operation produces a new pool state. In one embodiment, the hash unit 404 performs SHA-1, and each mixing operation takes 80 bytes of sample data from sample test unit 402 and 48 bytes from the pool in buffer 406 to produce 20 new bytes for the pool buffer 406. The 128-byte input buffer is a convenient block size for input to SHA-1. The number of bytes in the energy sample may vary depending on local service provider window sizes, but windows should be large enough to produce at least one block for input to the pool, typically more. When there are fewer than 80 bytes remaining in the current searcher sample, these remaining bytes will be discarded.

In step 540, random bits from the pool buffer 406 may be provided to a second hash unit 408. For example, the hash unit 408 may receive pool bytes from the pool buffer 406 in blocks of 64, and mix the pool bytes with SHA-1 to produce a new sequence of 20 bytes. The output of the hash unit 408 may be concatenated to form a number of the required size. Because the pool is uniformly distributed, additional distillation of the data is generally not required. However, using a second hash function to mix the bytes used to form the number provides a layer of isolation between the distillation of the entropy in the data from its use in a random number. While it has no effect on the entropy of the bits used to form the number, the second hashing operation increases the difficulty of cryptanalyzing the random number generator by observing the signal environment and the messages exchanged with a particular subscriber unit.

In a preferred embodiment, as soon as the pool is filled, a random number will be extracted from the pool, shown as step 550. The number extracted is then provided to a number test unit 410, as shown in step 560, which performs additional sanity checks to ensure that the number meets the requirements for use in the required process. The checks are similar to the testing performed on the energy samples by sample test unit 402. For example, numbers that are easily guessed, such as all 1's, all 0's, or alternating 1's and 0's, would be rejected. If the random number is rejected in step 560, processing reverts back to step 510, and the process begins once again. The number tested by number test unit 410 may then be provided for use as required by a cryptographic or other process, as shown in step 570.

It should be noted that once initialization of the pool is complete, and a number is extracted, a request for a number may be quickly filled. Once a number is extracted, the process to form a new number can begin. This enables the formation of the number to proceed at a lower priority than other processes in the subscriber unit, yet still assures good response when a number is required.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. An apparatus for generating random numbers in a wireless communication network wherein a synchronization signal is transmitted for identification of a transmitter, comprising:

means for generating a plurality of pseudorandom noise sequences, each of said pseudorandom noise sequences tested against a received signal for detection of said synchronization signal;

means for despreading said received signal with said pseudorandom noise sequences;

means for computing an energy measure for each signal despread with one of said pseudorandom noise sequences; and a random number generator for producing random numbers using said energy measures.

2. The apparatus of claim 1, wherein said random number generator produces random numbers based directly on said energy measures.

3. The apparatus of claim 1, wherein said random number generator uses a least significant bit portion of said energy measures to produce said random numbers.

4. The apparatus of claim 3, further comprising:

means for mapping said least significant bit portion from a square uniform distribution into a uniform distribution prior to producing said random numbers.

5. The apparatus of claim 1, wherein said random number generator comprises:

means for collecting at least one of said energy measures in a pool of bits; and means for distilling said bits to produce a random number.

6. The apparatus of claim 5, wherein said means for distilling performs a Secure Hash Algorithm-1 (SHA-1).

7. The apparatus of claim 5, wherein said means for distilling performs an MD5 hashing function.

8. The apparatus of claim 5, wherein said means for distilling performs a compression scheme.

9. The apparatus of claim 1, further comprising means for testing said energy measures for compliance with a set of predetermined criteria prior to collecting said energy measures in a pool of bits.

10. The apparatus of claim 5, wherein said means for distilling comprises:

a first means for hashing said bits to produce a new state of said pool of bits; and a second means for hashing the bits of said new state of said pool of bits to produce said random number.

11. The apparatus of claim 10, further comprising means for testing said random number for compliance with a set of predetermined criteria.

12. The apparatus of claim 1, wherein said means for computing said energy measure comprises:

at least one integrator; and an energy computation unit.

13. The apparatus of claim 12, wherein said means for computing said energy measure further comprises a noncoherent integrator.

14. An apparatus for generating random numbers in a wireless communication network wherein a synchronization signal is transmitted for identification of a transmitter, comprising:

a searcher for receiving an incoming signal, for despreading said incoming signal with a pseudorandom noise sequence, for testing said pseudorandom noise sequence against said incoming signal for detection of said synchronization signal, for measuring the energy of said despread signal, and for providing said energy; and a random number generator for receiving said energy, adding said energy to a pool of bits, and hashing said bits to produce a random number.

15. The apparatus of claim 14, wherein said random number generator performs hashing using an SHA-1 hashing function.

16. The apparatus of claim 14, wherein said random number generator performs hashing using an MD5 hashing function.

17. The apparatus of claim 14, wherein said random number generator further tests said energy for compliance with a set of predetermined criteria prior to adding said energy to said pool of bits.

18. The apparatus of claim 14, wherein said random number generator comprises:

means for testing said received energy measure for compliance with a first set of predetermined criteria;

a buffer for storing said pool of bits into which said energy is added;

a first means for hashing said bits to produce a new state of said pool of bits; and a second means for hashing the bits of said new state of said pool of bits to produce a random number.

19. The apparatus of claim 18, further comprising means for testing said random number for compliance with a second set of predetermined criteria.

20. A method for generating random numbers in a wireless communication network wherein a synchronization signal is transmitted for identification of a transmitter, comprising the steps of:

receiving an incoming signal;

despreading said incoming signal with a pseudorandom noise sequence;

measuring the energy of said despread signal; and extracting a random component from said energy to produce a random number.

21. The method of claim 20, wherein the step of extracting said random component comprises the steps of discarding a most significant bit portion of said energy and using a remaining least significant bit portion of said energy to produce said random number.

22. The method of claim 21, further comprising the step of using a mapping function to map said least significant bit portion from a square uniform distribution into a uniform distribution prior to producing said random numbers.

23. The method of claim 20, wherein said step of extracting is accomplished using a hash function.

24. The method of claim 23, wherein said hash function comprises a SHA-1 hashing function.

25. The method of claim 23, wherein said hash function comprises a MD5 hashing function.

26. The method of claim 20, wherein said step of extracting comprises the steps of:

adding said energy to a pool of bits;

hashing said pool of bits to produce a new state of said pool of bits; and hashing said bits of said new state to produce said random number.

27. The method of claim 26, further comprising the step of testing said energy for compliance with a set of minimum criteria prior to adding said energy to said pool of bits.

28. The method of claim 26, further comprising the step of testing said random number for compliance with a set of minimum criteria.

29. An apparatus for generating random numbers in a wireless communication network wherein a synchronization signal is transmitted for identification of a transmitter, comprising:

a receiver for providing an in-phase signal and a quadrature-phase signal to a random number generator; and said random number generator connected to said receiver for generating a random number based on at least one of said signals, wherein said random number generator comprises means for hashing said at least one of said signals to produce said random number.

30. The apparatus of claim 29, wherein said random number generator generates said random number based on said quadrature-phase signal.

31. The apparatus of claim 29, wherein said random number generator generates said random number based on said in-phase signal.

32. The apparatus of claim 29, wherein said random number generator generates said random number based on said in-phase signal and said quadrature-phase signal.

* * * * *